(12) United States Patent
Tung et al.

(10) Patent No.: US 7,980,870 B2
(45) Date of Patent: Jul. 19, 2011

(54) ELECTRICAL CARD CONNECTOR

(75) Inventors: Chang-Hsien Tung, Tu-Cheng (TW); Tzu-Ching Tsai, Tu-Cheng (TW); Kai-Li Wang, Tu-Cheng (TW)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 12/842,079

(22) Filed: Jul. 23, 2010

(65) Prior Publication Data

US 2011/0021079 A1    Jan. 27, 2011

(30) Foreign Application Priority Data

Jul. 23, 2009   (TW) ............................... 98213533 U

(51) Int. Cl.
*H01R 13/62* (2006.01)
(52) U.S. Cl. ........................ 439/159; 439/630
(58) Field of Classification Search .................. 439/159, 439/138–140, 143, 145, 630, 633
See application file for complete search history.

(56) References Cited

U.S. PATENT DOCUMENTS

| | | | | |
|---|---|---|---|---|
| 7,448,912 B1 * | 11/2008 | Shiue et al. | ..................... | 439/630 |
| 7,540,783 B2 * | 6/2009 | Lai et al. | ........................ | 439/630 |
| 7,878,858 B1 * | 2/2011 | Tung et al. | ..................... | 439/630 |
| 2011/0008982 A1 * | 1/2011 | Tung et al. | ..................... | 439/152 |
| 2011/0021079 A1 * | 1/2011 | Tung et al. | ..................... | 439/630 |

FOREIGN PATENT DOCUMENTS

CN            2829137         10/2006

* cited by examiner

*Primary Examiner* — Neil Abrams
*Assistant Examiner* — Phuong T Nguyen
(74) *Attorney, Agent, or Firm* — Ming Chieh Chang; Wei Te Chung; Andrew C. Cheng

(57) ABSTRACT

An electrical card connector (100) includes an insulative housing (10) defining a card receiving room, at least one set of terminals (30) retained in the insulative housing, and an ejector attached on the insulative housing. Each terminal has a soldering portion (303) extending out of the insulative housing and a contacting portion (301) extending towards the card receiving room. The ejector includes a slider (50), at least one spring member (90) and at least one pin member (80) cammedly pushing an inserted card. The slider includes a base portion (501) pressing against the contacting portions of the terminals and a pair of arm portions (503) extending laterally from the base portion. The base portion defines a number of passageways (502) and forms a number of protrusions (5011) extending into the corresponding passageways. The slider blocks the contacting portions from entering the card receiving room at an original position and moves to an inner position for giving way for the contacting portions. The contacting portions extend through the passageways into the card receiving room are supported by the protrusions.

9 Claims, 6 Drawing Sheets

US 7,980,870 B2

ELECTRICAL CARD CONNECTOR

BACKGROUND OF THE INVENTION

1. Field of the Invention

The present invention relates generally to an electrical card connector, and more particularly to an N-in-1 card connector capable of receiving multiple cards and providing enough normal force of the terminals thereof.

2. Description of Related Arts

N-in-1 card connectors are widely used in compact devices today. An N-in-1 card connector selectively receives different cards. Usually, the N-in-1 card connector comprises a casing and more than two sets of terminals retaining in the casing along a front-to-back direction and extending cantilevered into the corresponding respective spaces for engaging with the corresponding cards. At least one set of terminals have much long connecting portions such that the contacting portions thereof connecting with one end of the connecting portions are positioned in the middle of the casing while the soldering portions thereof connecting with the other end of the connecting portions extend out of the casing for soldering with a printed circuit board. The connecting portions of the terminals have large elasticity such that it prevents a risk that the contacting portions thereof are pressed down to a lower position when a corresponding card is inserted but may not return to an original position when the corresponding card is ejected in durable use. However, another risk occurs that the normal force of the terminals is not large enough and the contact between the contacting portions and the card is not reliable.

Hence, an improved N-in-1 card connector is desired to overcome the aforementioned disadvantage of the prior art.

SUMMARY OF THE INVENTION

Accordingly, an object of the present invention is to provide an N-in-1 card connector having one set of terminals with both large elasticity and large normal force to the card.

To achieve the above object, an electrical card connector includes an insulative housing defining a card receiving room, at least one set of terminals retained in the insulative housing, and an ejector attached on the insulative housing. Each terminal has a soldering portion extending out of the insulative housing and a contacting portion extending towards the card receiving room. The ejector includes a slider, at least one spring member and at least one pin member cammedly pushing an inserted card. The slider includes a base portion pressing against the contacting portions of the terminals and a pair of arm portions extending laterally from the base portion. The base portion defines a number of passageways and forms a number of protrusions extending into the corresponding passageways. The slider blocks the contacting portions from entering the card receiving room at an original position and moves to an inner position for giving way for the contacting portions. The contacting portions extend through the passageways into the card receiving room are supported by the protrusions.

Other objects, advantages and novel features of the invention will become more apparent from the following detailed description when taken in conjunction with the accompanying drawings.

DETAILED DESCRIPTION OF THE PREFERRED EMBODIMENT

Figure 1:
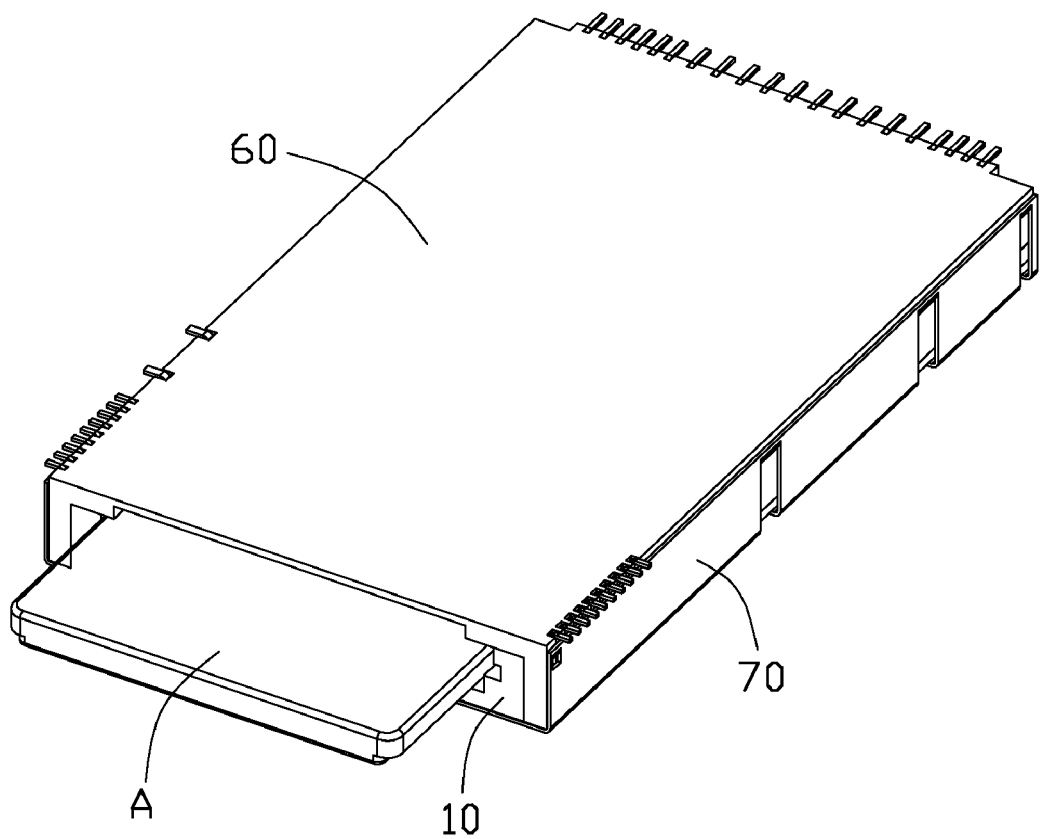
FIG. 1 is a perspective, assembled view of a card connector constructed in accordance with the present invention with a SD card A is inserted.

Reference will now be made in detail to the preferred embodiment of the present invention.

Referring to FIGS. 1-6, an N-in-1 card connector 100 of the present invention is used for receiving three cards, preferably a MS (Memory Stick) card (not shown), a SD (Secure Digital Memory) card (shown in FIGS. 1, 4-6 as card A) and a XD (XD-Picture) card (not shown) in this embodiment. The card connector 100 includes an insulative housing 10, a plurality of first terminals 20, a plurality of second terminals 30 and a plurality of third terminals 40 received in the insulative housing 10, a slider 50 moveably attached to the insulative housing 10, a top, plastic shell 60 and a bottom, metallic shell 70 attaching to the insulative housing 10. The top shell 60 covers the slider 50 and the insulative housing 10 for defining three card receiving rooms (not labeled), which respectively receives the MS card, the SD card, and the XD card. The three card receiving rooms are in communication with each other and the three cards are inserted into the three card receiving rooms along a same direction through a same card inserting port.

Figure 2:
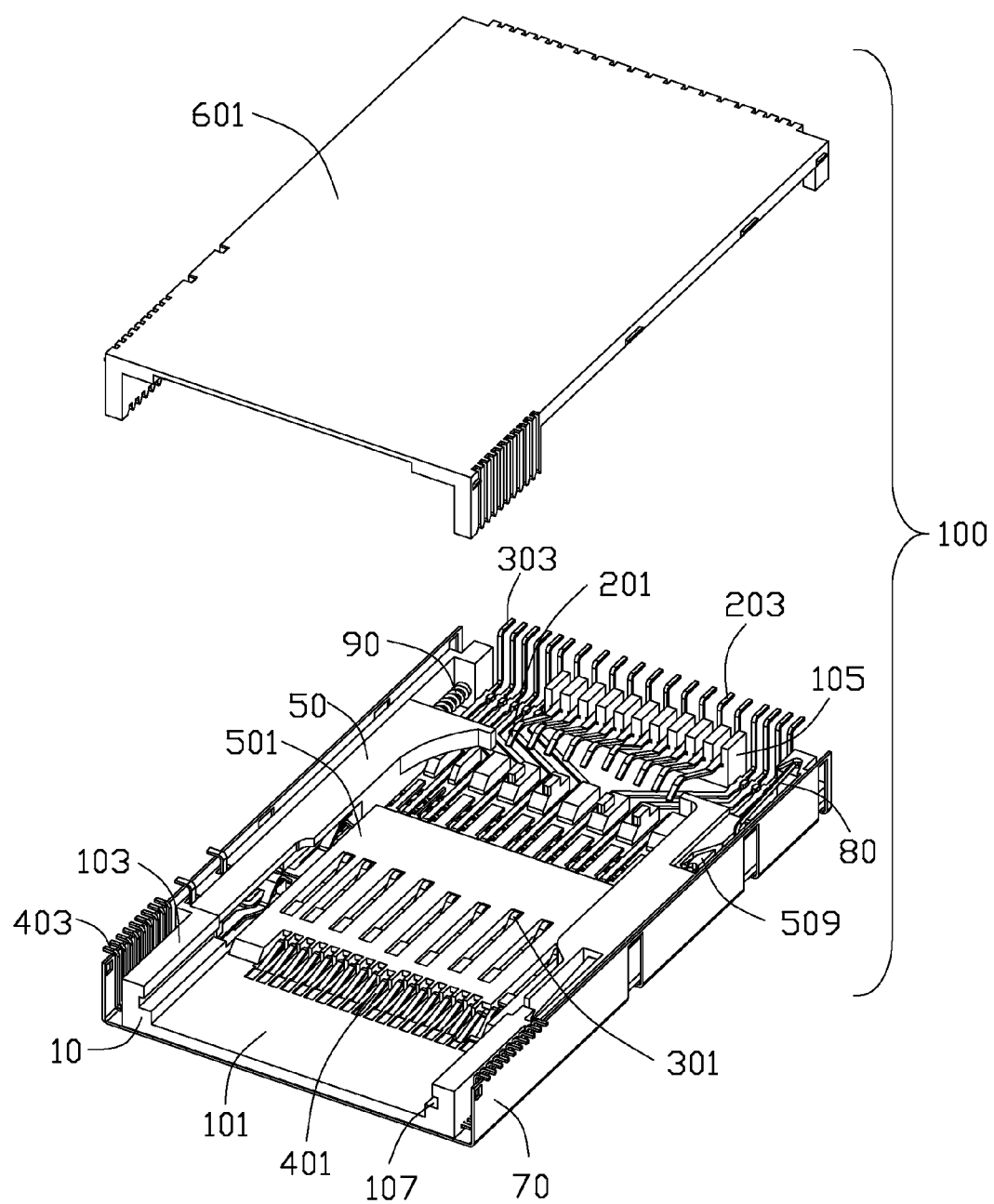
FIG. 2 is a perspective, partly assembled view of the card connector.
Figure 3:
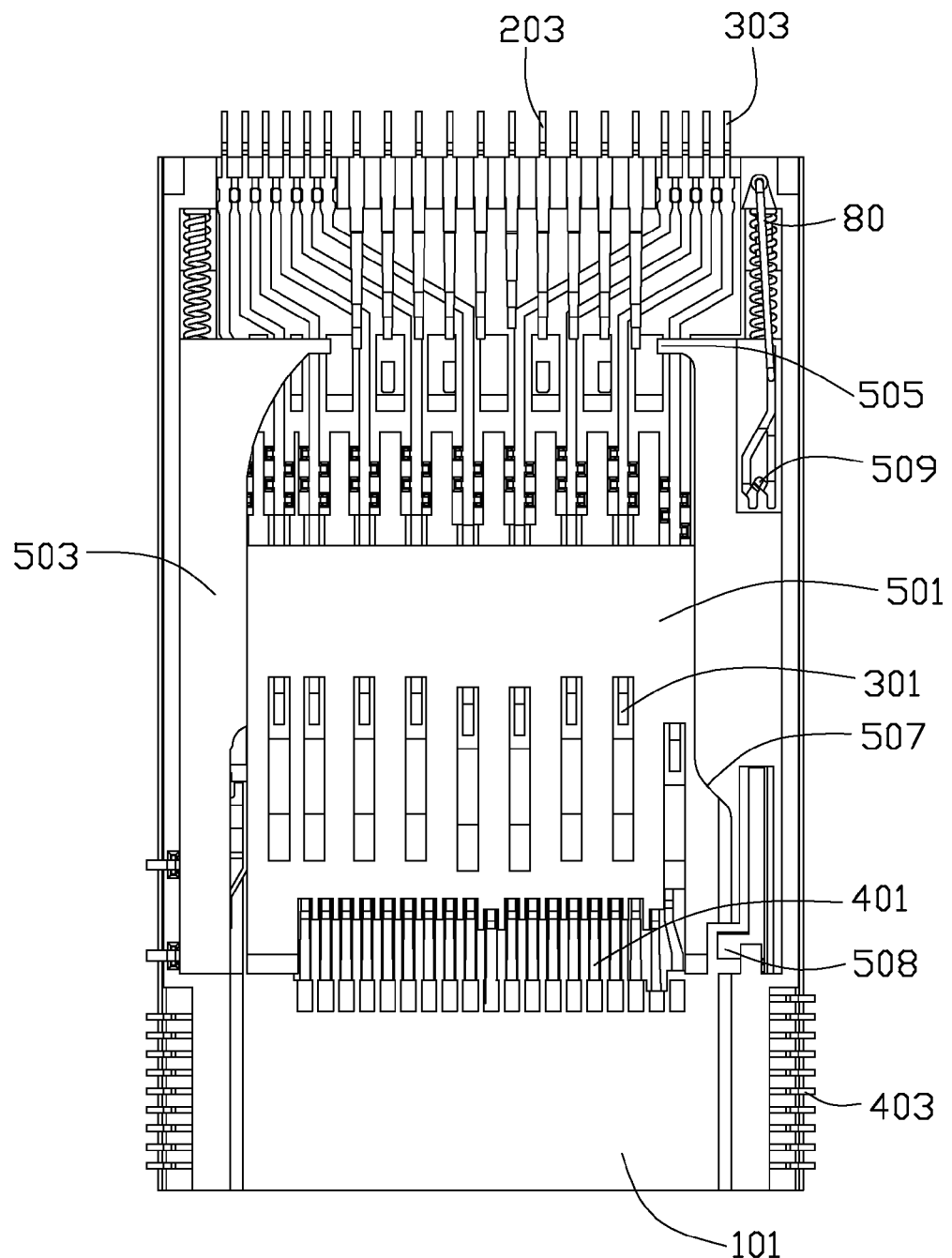
FIG. 3 is a top view of the card connector without a top shell.
Figure 4:
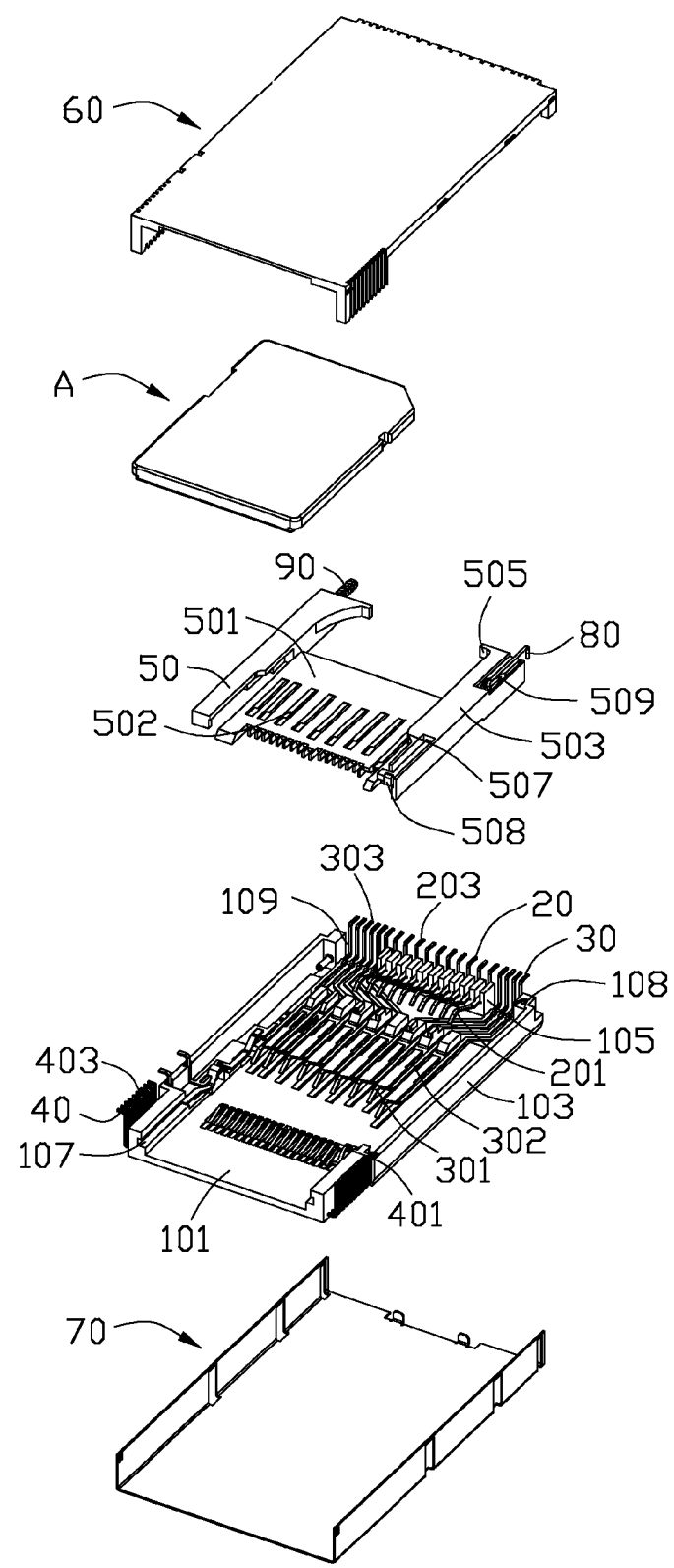
FIG. 4 is a perspective, exploded view of the card connector.

Referring to FIGS. 2-4, the insulative housing 10 is plastic. The insulative housing 10 comprises a base 101, a pair of lateral walls 103 extending upwards from the lateral edges of the base 101, and a front wall 105 extending upwards from the front edge of the base 101. An interspace 109 is defined between the front wall 105 and each lateral wall 103. The insulative housing 10 has a front part, a middle part, and a rear part thereof, taking along the card's insertion direction, defining a first card receiving room, a second card receiving room and a third card receiving room respectively for the MS card, the SD card A, and the XD card. The first terminals 20 are assembled at the front wall 105 of the insulative housing 10. The first terminals 20 are linearly arranged and comprise a plurality of first soldering portions 203 extending forwards and being exposed out of the insulative housing 10 for soldering with a printed circuit board (not shown) and a plurality of first contacting portions 201 extending rearwards into the first card receiving room for contacting with the MS card. The second terminals 30 and the third terminals 40 are insert-molded with the insulative housing 10. The second terminals 30 have a plurality of second soldering portions 303 extending out of the insulative housing 10 throughout the interspace 109 and abutting two sides of the first soldering portions 203. The second terminals 30 further have a plurality of second contacting portions 301 extending into the middle part of the insulative housing 10 and a plurality of second connecting portions 302 curvedly connecting with the second soldering portions 303 and the second contacting portions 301. The base 101 of the insulative housing 10 defines a plurality of cavities 102 for partly receiving the second connecting portions 302. The third terminals 40 comprises a plurality of third contacting portions 401 extending forwards into the third card receiving room and a plurality of third soldering portions 403 extending laterally out of the insulative housing 10 through the opposite lateral walls 103. The third contacting portions 401 extend along the card's insertion direction while the soldering portions 403 in two rows extend along a transverse direction perpendicular to the card's insertion direction. Each lateral wall 103 defines a guiding slot 107 at a rear end thereof for guiding each card inserted into each corresponding card receiving room. One of the lateral walls 103 defines an aperture 108 at a front end thereof.

Referring to FIGS. 2 and 4, the slider 50 is rectangular and comprises a base portion 501 and a pair of arm portions 503 extending laterally from the base portion 501. The base portion 501 defines a plurality of passageways 502 thereof. Each arm portion 503 forms a first engaging portion 505, a second engaging portion 507 and a third engaging portion 508, respectively extending into the first, the second and the third card receiving rooms for abutting with the corresponding inserted cards. Each arm portion 503 defines a heart-shaped slot 509 at a front end thereof. The electrical connector 100 further comprises a pin member 80 slideably moveable along the heart-shaped slots 509 and a spring member 90 conflicting with the front edge of the base portion 501. The slider 50, the pin member 80, and the spring member 90 are cooperatively combined as an ejector for the three cards. In an alternative embodiment, the pin member 80 and the spring member 90 are both numbered in two, such that a balanced force is generated to the card. Push-push ejectors are well-known to people skilled in the art, and it is not described in detail herein.

Referring to FIGS. 1-6, in assembly, the slider 50 is moveably assembled to the insulative housing 10, one end of the pin member 80 is secured in the aperture 108 while the other end of each pin member cammedly moves in the heart-shaped slot 509, and the spring member 90 is sandwiched between the insulative housing 10 and the slider 50. The slider 50 moves towards the spring member 90 and compresses the spring member 90 to have elasticity. The plastic shell 60 is attached to the top of the insulative housing 10 and a metallic shell 70 is attached to a bottom surface of the insulative housing 10.

Figure 5:
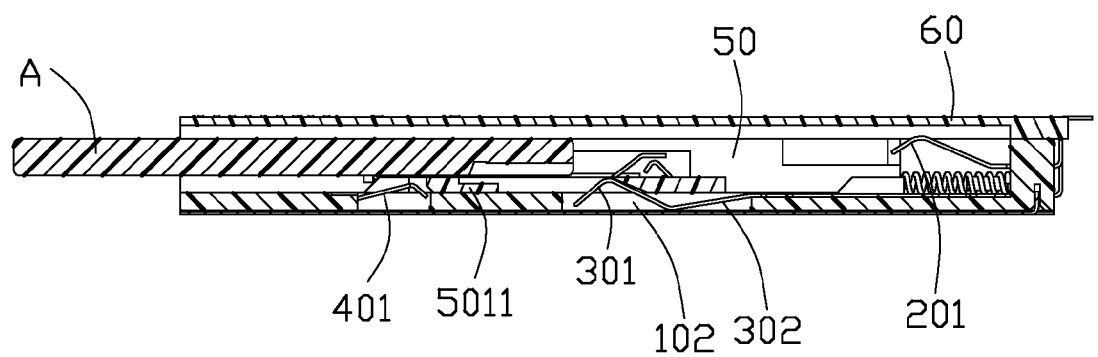
FIG. 5 is a cross-sectional view of the card connector when the SD card A is not fully inserted.
Figure 6:
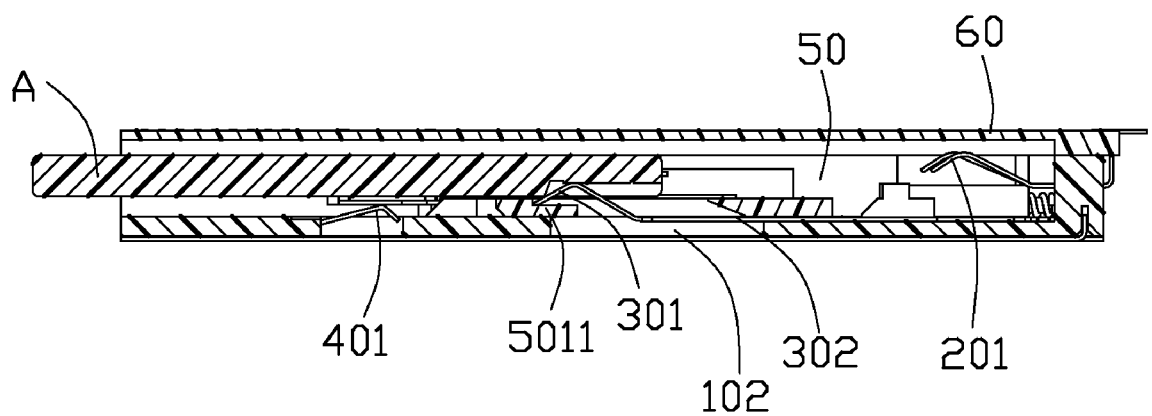
FIG. 6 is a cross-sectional view of the card connector when the SD card A is fully inserted.

Referring to FIGS. 5 and 6, when the SD card A is not fully inserted into the second card receiving room, the slider 50 is positioned at an original position and obstacles the second contacting portions 301 of the second terminals 30 from the second card receiving room. The second connecting portions 302 are partly received in the cavities 102 of the insulative housing 10. When the SD card A is fully inserted in, the slider 50 is moved by the SD card A to an inner position for giving way for the second contacting portions 301 to be exposed in the second card receiving room. The second connecting portions 302 deviate away from the cavities of the insulative housing 10. The slider 50 further comprises a plurality of protrusions 5011 extending into the passageways 502 and supporting the second contacting portions 301 of the second terminals 30. When the SD card A is ejected, the slider 50 returns back to the original position and presses against the second contacting portions 301. The second connecting portions 302 are pressed back to the cavities 102. During the SD card's insertion/ejection, the second contacting portions 301 of the second terminals 30 are floated between a lower position and an upper position along a vertical direction.

In the present invention, because the second contacting portions 301 of the second terminals 30 extend through the passageways 502 of the slider 50 into the second card receiving room for contacting with the SD card A, and the second contacting portions 301 are supported by the protrusions 5011 in the passageways 502, the normal force of the second terminals 30 is large, and the electrical connection between the SD card A and the second terminals 30 are reliable. The second connecting portions 302 of the second terminals 30 are long and accordingly, have sufficient elasticity to prevent the contacting portions 301 thereof, during movement of being pressed down to the lower position and returning to an original position from being permanently deformed.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electrical card connector comprising:
   an insulative housing defining a card receiving room; at lest one set of terminals retained in the insulative housing, each terminal having a soldering portion extending out of the insulative housing and a contacting portion extending towards the card receiving room; and
   an ejector attached on the insulative housing, the ejector comprising a slider, at least one spring member and at least one pin member cammedly pushing an inserted card, the slider comprising a base portion pressing against the contacting portions of the terminals and a pair of arm portions extending laterally from the base portion, the base portion defining a plurality of passageways and forming a plurality of protrusions extending into the corresponding passageways; wherein
   the slider blocks the contacting portions from entering the card receiving room at an original position and moves to an inner position for giving way for the contacting portions, and the contacting portions extend through the passageways into the card receiving room are supported by the protrusions;
   the arm portions form at least three engaging portions for abutting with at least three cards;
   two pin members and two spring members are included therein, and the slider cooperates with the pin members and the spring members as two ejectors for the cards.

2. The electrical card connector as described in claim 1, wherein the contacting portions move from lower positions to upper positions along a vertical direction pursuant to a movement of the slider from the original position to the inner position.

3. The electrical card connector as claimed in claim 1, further comprising a top, plastic shell covering an upper face of the insulative housing and a bottom, metallic shell attaching to a lower face of the insulative housing.

4. The electrical card connector as described in claim 1, wherein the terminals have a plurality of connecting portions connecting with the soldering portions and the contacting portions.

5. The electrical card connector as described in claim 4, wherein the connecting portions are partly insert-molded in the insulative housing.

6. The electrical card connector as described in claim 4, wherein the insulative housing defines a plurality of cavities partly receiving the connecting portions when the slider is at the original position.

7. The electrical card connector as claimed in claim 6, wherein one the arm portion defines an aperture locking with the pin member and the other arm portion conflicts the spring member.

8. The electrical card connector as claimed in claim 6, further comprising a plurality of second terminals and a plurality of third terminals located at an inner part and a rear part of the insulative housing, for respectively contacting with a second card and a third card.

9. An electrical card connector for use with different electronic cards, comprising:
- an insulative housing defining a card receiving space;
- a plurality of contacts disposed in the housing with contacting sections extending toward the card receiving space;
- a slider, which is adapted to be actuated by the cards, back and forth moveable relative to the housing in a front-to-back direction between opposite front and rear positions, said slider including a horizontal base defining a plurality of passageways extending therethrough in a vertical direction perpendicular to said front-to-back direction; wherein
  - when no card is inserted into the card receiving space, the slider is located at the front position where the contacting sections are downwardly pressed by the slider without entering the card receiving space;
  - when the card is inserted into the card receiving space, the slider is moved to the rear position to have the passageways aligned with the contacting sections in said vertical direction so as to allow the contacting sections to upwardly extend therethrough and into the card receiving space due to resiliency of the contacting sections, while each of said contacting sections successively is downwardly pressed mechanically and electrically by the card with a tip region of the contacting section downwardly seated upon an upward supporting area of the slider; wherein
- the slider includes at least one arm defining a plurality of engaging portions for mutually exclusive engagement with the different cards, respectively.

* * * * *